(12) United States Patent
Ausch

(10) Patent No.: US 8,441,769 B2
(45) Date of Patent: May 14, 2013

(54) POWER SUPPLIES

(75) Inventor: Myran M. Ausch, London (GB)

(73) Assignee: NetBit Electronics Limiteds, London (GB)

( * ) Notice: Subject to any disclaimer, the term of this patent is extended or adjusted under 35 U.S.C. 154(b) by 0 days.

(21) Appl. No.: 12/516,090

(22) PCT Filed: Nov. 23, 2007

(86) PCT No.: PCT/GB2007/004497
§ 371 (c)(1),
(2), (4) Date: Jan. 21, 2010

(87) PCT Pub. No.: WO2008/062215
PCT Pub. Date: May 29, 2008

(65) Prior Publication Data
US 2010/0128406 A1 May 27, 2010

(30) Foreign Application Priority Data
Nov. 23, 2006 (GB) .................................. 0623391.0

(51) Int. Cl.
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl.
USPC ............................................ 361/119; 361/111

(58) Field of Classification Search ................... 361/119, 361/111
See application file for complete search history.

(56) References Cited

U.S. PATENT DOCUMENTS

| 5,790,363 A * | 8/1998 | Chaudhry | 361/119 |
| 6,252,754 B1 * | 6/2001 | Chaudhry | 361/111 |
| 7,271,991 B2 * | 9/2007 | Hoopes | 361/119 |
| 2005/0185357 A1 * | 8/2005 | Hoopes | 361/119 |

FOREIGN PATENT DOCUMENTS

WO WO-00/31852 6/2000

OTHER PUBLICATIONS

International Search Report and the Written Opinion issued for PCT/GB2007/004497, dated Feb. 13, 2008, 7 pages.

* cited by examiner

*Primary Examiner* — Jared Fureman
*Assistant Examiner* — Lucy Thomas
(74) *Attorney, Agent, or Firm* — Fulbright & Jaworski L.L.P.

(57) ABSTRACT

The present invention provides a power supply (200) comprising a ground terminal (110, 320), means (102, 104, 240, 242) for receiving and transmitting a telecommunications signal from/to at least one telecommunications device and means (100) for protecting the telecommunications device from a surge by shunting the surge to the ground terminal (110, 320).

12 Claims, 3 Drawing Sheets

POWER SUPPLIES

This invention relates to power supplies. More specifically, this invention relates to surge protection for power supplies.

Telecommunication lines experience power surges caused by various factors, including lightning and interference caused by other devices for example. These surges can damage a device connected to the telecommunication line. Such devices include a router, a modem, a fax machine, a switch and a Private Branch Exchange (PBX) for example, and/or the power supply providing the AC/DC power. Further, the surges can also cause noise interference in the telecommunications signal, which can reduce/interrupt the transmission signal.

Surge protectors are commonly used to protect telecommunication devices. These are usually in the form of a separate device placed between a telephone socket and the device using the telephone line, or are integrated into a power cord or extension lead. These protection devices would normally incorporate surge arrestors, varistors, and/or a ground connection. These protection devices are costly, and are not commonly provided with a telecommunications device.

It is an aim of the present invention to address the aforementioned problems.

In accordance with the present invention there is provided a power supply comprising:
a ground terminal;
means for receiving and transmitting a telecommunications signal from/to at least one telecommunications device; and
means for protecting the telecommunications device from a surge by shunting the surge to the ground terminal.

Integrating the protection circuitry within the power supply provides protection against a power surge along the telecommunications cable, thereby overcoming the problems discussed above.

The main advantage of the power supply of the present invention is that it combines a power supply function which provides AC/DC conversion and thus power to the device, with power surge protection for the telecommunications device. This is done by routing the telecommunications signal (e.g. ADSL) coming from the telecommunications provider via the power supply, where extra protection components are located, and then on to the telecommunications device. The present invention uses the ground connection of the power supply to surge protect the telecommunications device and optionally the power supply as well. This can give protection to the telecommunications line and the power supply in a single solution.

In accordance with a preferred embodiment of the present invention the means for protecting the telecommunications device comprises a first fuse connected in a receive/transmit path in the means for receiving and transmitting.

In accordance with a preferred embodiment of the present invention the means for receiving and transmitting comprises a first telecommunications connector and a second telecommunications connector coupled communicatively to form a receive/transmit path.

In accordance with a preferred embodiment of the present invention the first fuse is configured to route the telecommunications signal between the first telecommunications connector and the second telecommunications connector when a threshold has not been exceeded; and
wherein the first fuse is configured to route the telecommunications signal to the ground terminal when a threshold has been exceeded.

In accordance with a preferred embodiment of the present invention a second fuse is coupled upstream of the first fuse and the ground terminal. Preferably, the second fuse is configured to prevent the surge from passing therethrough, and thus to ensure it routes to ground.

Preferably, the first fuse is a tripolar gasfuse. More preferably, the second fuse is a tripolar gasfuse or a bipolar gasfuse.

Preferably, the first and second telecommunications connectors are physical sockets. More preferably, the first and second telecommunications connectors each comprise an ADSL socket.

In accordance with a preferred embodiment of the present invention the power supply further comprises a power input means and a power output means and the power supply further comprises means for protecting the power supply from a power surge by shunting the power surge to the ground terminal.

Preferably the power supply further comprises at least three varistors coupled between the power input means and the ground terminal. Preferably, the power input means comprises a live terminal and a neutral terminal, and a varistor is connected between each of the live and neutral terminals and a node, and between the node and the ground terminal. Preferably, each varistor is coupled to a thermal fuse.

In accordance with a preferred embodiment of the present invention the power supply converts AC power received by the power input means to DC power outputted by the power output means.

A specific embodiment of the present invention is now described, by way of example only, with reference to the accompanying drawings, in which:—

With reference to the accompanying drawings, there is illustrated a power supply according to the present invention. The power supply is designed to provide surge protection to telecommunication devices and to the power supply, as well as providing power. The power supply of the present invention is adapted for use with all telecommunication devices which can connect to a telecommunications network and that also require power to operate. For example, it may be an AC/DC power supply used to power a PSTN terminal.

Figure 1:
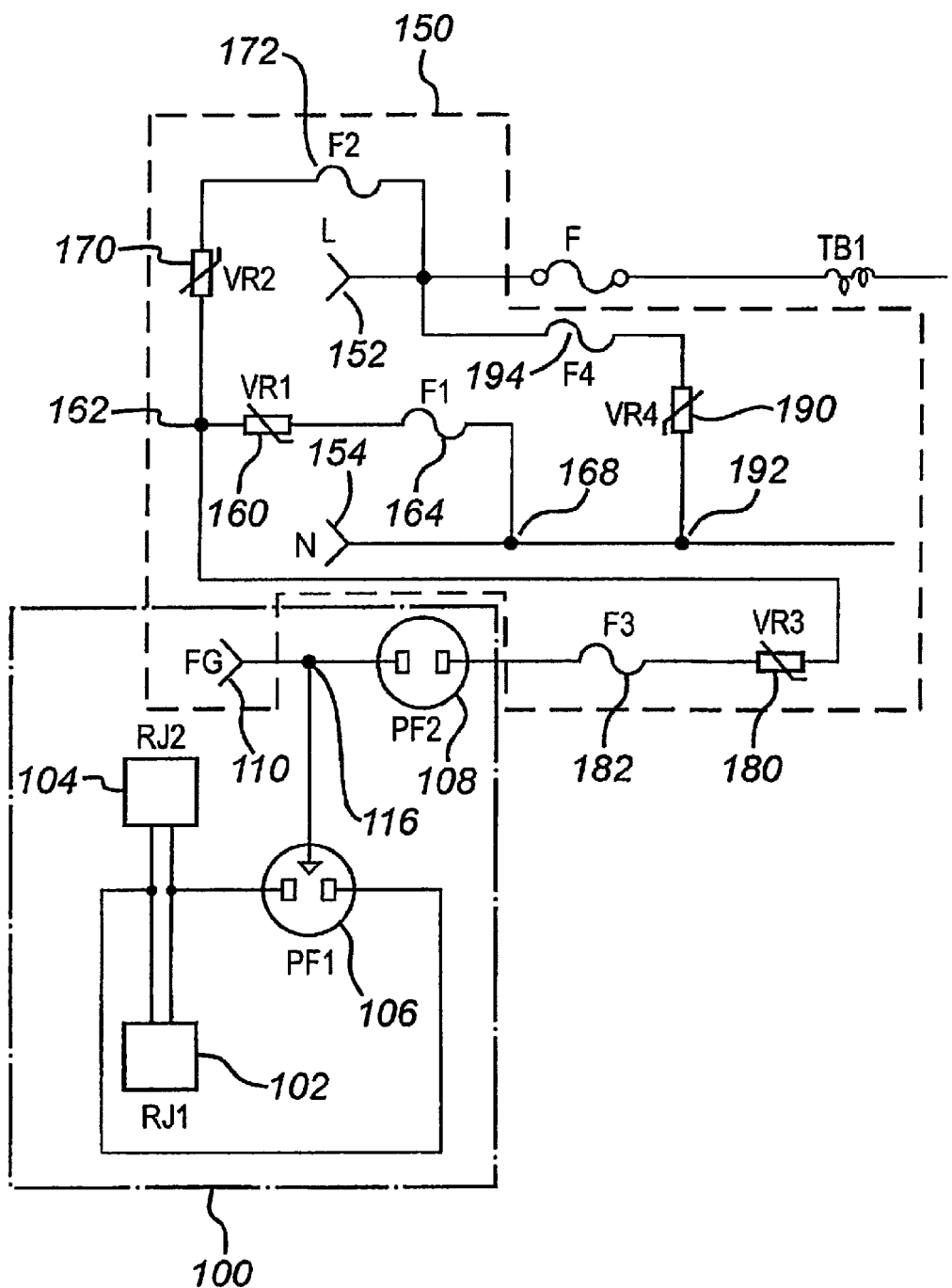
FIG. 1 is a schematic of a circuit incorporating protection circuits according to the present invention.
Figure 2:
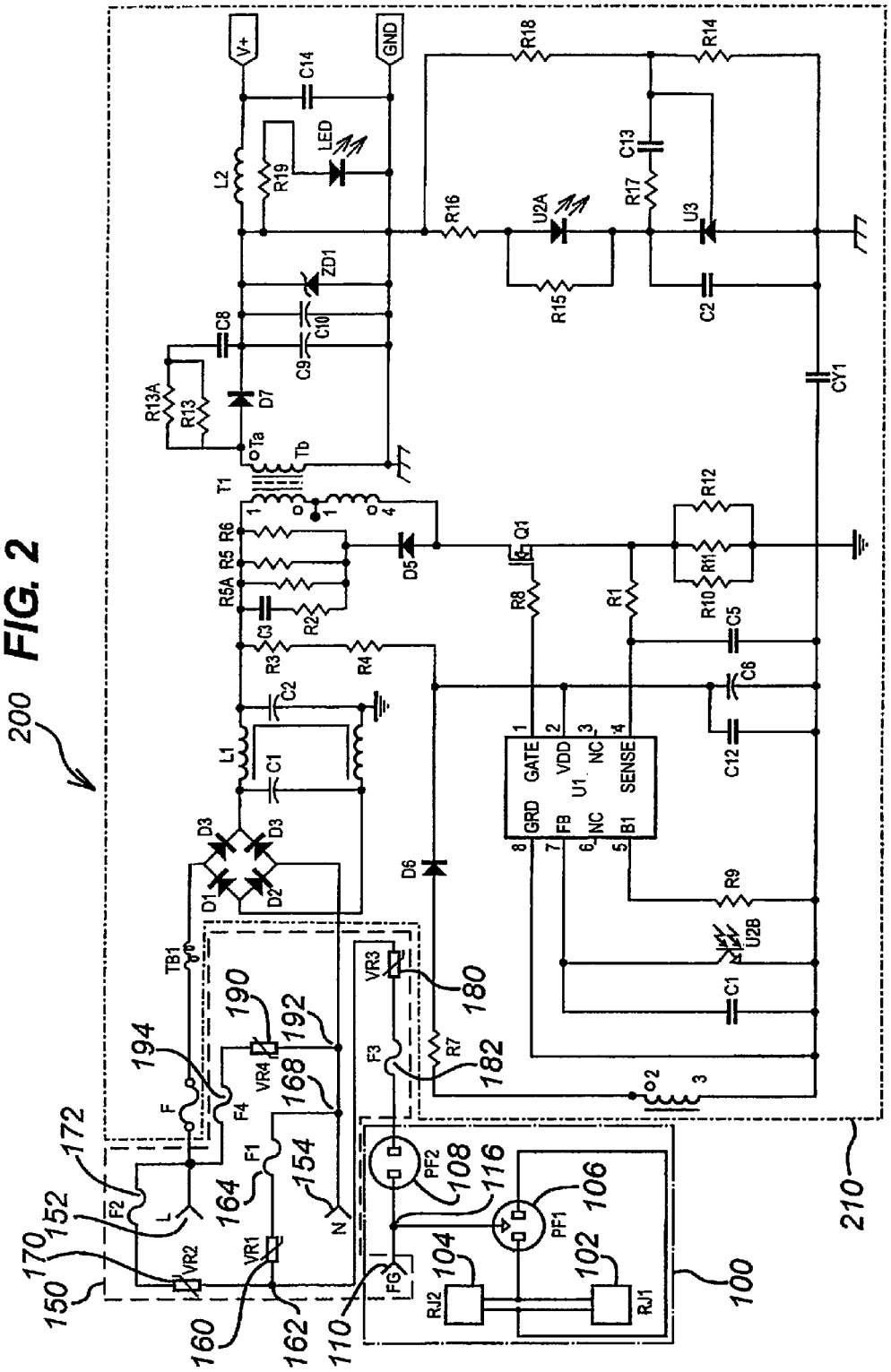
FIG. 2 is a schematic of a power supply circuit incorporating the circuit of FIG. 1.

With reference to FIGS. 1 and 2 of the accompanying drawings, there is illustrated a power supply (200) according to the present invention. The power supply (200) is made up of a telecommunications protection circuit (100), a power supply protection circuit (150) and a power supply electronic circuit (210).

The telecommunications protection circuit (100) is configured to protect a telecommunications device from a surge such as a power surge, as explained below. The telecommunications protection circuit comprises a ground terminal (110), means for receiving and transmitting a telecommunications signal to at least one telecommunications device and means for protecting the telecommunications device from a power surge. The means for receiving and transmitting the telecommunications signal can comprise a first telecommunications connector (102), e.g. an RJ11 plug/socket such as "SD-8949-L1661/50BLKA"OUTPIN"GP, and a second telecommunications connector (104), e.g. an RJ11 plug/socket such as "SD-8949-L1661/50BLKA"OUTPIN"GP. Alternatively the means of receiving and/or transmitting may take the form of hard wiring. The means for protecting the telecommunications device from a surge comprises a first fuse, namely a tripolar gasfuse (106), e.g., a 600V tripolar gasfuse such as GB83R600"THINKING"GP or a 470V tripolar gasfuse such as GD82R470"THINKING"GP. This is arranged as follows. The first telecommunications connector (102) and the second telecommunications connector (104) are coupled directly to each other. In addition, the first telecommunications connector (102) and the second telecommunications connector (104) are coupled to each other via two terminals of the tripolar gasfuse (106). Further, the tripolar gasfuse (106), the ground terminal (110) and a bipolar gasfuse (108) are connected together at a node (116). Alternatively, a tripolar gasfuse e.g., a 470V tripolar gasfuse such as GD82R470"THINKING"GP or a 600V tripolar gasfuse such as GB83R600"THINKING"GP may be used in place of the bipolar gasfuse (108).

Moving on, the power supply protection circuit (150) is configured to protect a power supply from a power surge at an input to the power supply. The power supply protection circuit shares a ground terminal (110) with the telecommunications protection circuit (100). Furthermore, the power supply protection circuit (150) comprises power input means and power output means (not shown). The power input means comprises a live input (152) and a neutral input (154).

In one embodiment of the power supply protection circuit four varistors, e.g. MOV471 KD14 I5SL "SONG LONG"4.6 mm"GP, 241 KD20"SONG LONG"4+/−0.5 mm"GP or 391 KD20"SONG LONG"4.5 mm"GP are coupled between the power input means and the ground terminal (110). Specifically, a first varistor (160), e.g. a 241 KD20J, has one of its terminals coupled to a first node (162) and another terminal connected to a first thermal fuse (164), e.g., a 5 A 250V AC S-105 115'C"A2-5A-F GP. The first thermal fuse (164) is in turn connected to a second node (168). A second varistor (170), e.g., a 241 KD20J, has one terminal coupled to the first node (162) and another terminal connected to a second thermal fuse (172), e.g., a 5 A 250V AC S-105 115"C"A2-5A-F GP. The second thermal fuse (172) is in turn connected to the live input (152). A third varistor (180), e.g., a 391 KD20, has one terminal coupled to the first node (162) and another terminal coupled to a third thermal fuse (182), e.g., a 5 A 250V AC S-105 115"C"A2-5A-F GP. The third thermal fuse (182) is in turn connected to one terminal of the bipolar gasfuse (108) which is shared with the telecommunications protection circuit. Finally, a fourth varistor (190) has one terminal connected to a second node (192) and another terminal connected to a fourth thermal fuse (194), e.g., a 5 A 250V AC S-105 115"C"A2-5A-F GP. The fourth thermal fuse is also coupled to the live input (152).

With reference to FIG. 2, the power supply circuit (200) comprises the telecommunications protection circuit (100), the power supply protection circuit (150) and the electronic power supply circuit (210). The electronic power supply circuit (210) is any known power supply circuit and is therefore not described in detail herein. Of course, a power supply according to the invention could be provided with only telecommunications protection.

Key to the invention is that the live (152) and the neutral (154) terminals of the power supply protection circuit (150) are shared with the electronic power supply circuit (210). As such the electronic power supply circuit (210) is connected to those terminals which form the inputs thereto. Similarly, the ground terminal (110) of the telecommunications protection circuit is shared also with the electronic power supply circuit (210) and the power supply protection circuit (150). Hence the electronic power supply circuit (210) and any telecommunications device attached to the terminal (152) are protected from surges such as power surges through the shunting of the surge to the common ground terminal (110)

Figure 3A:
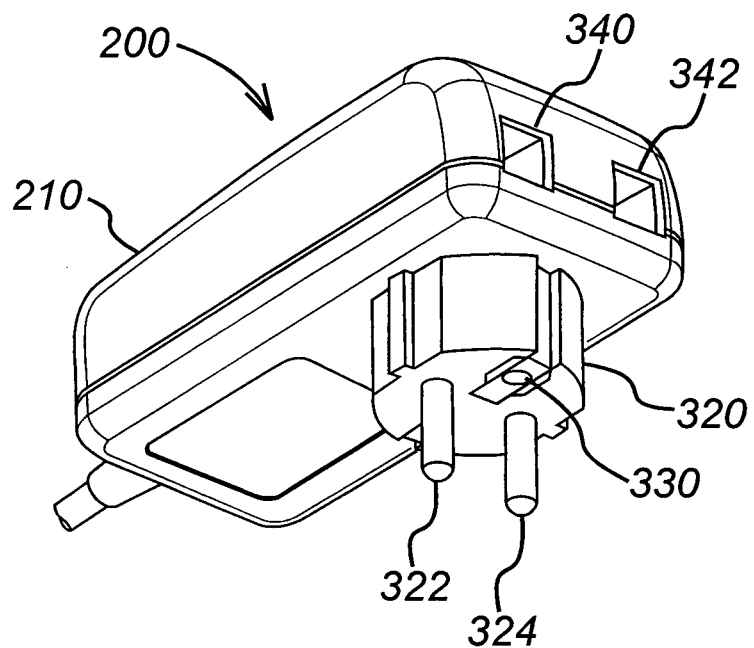
FIG. 3(A) is a perspective view of a power supply according to the present invention enclosed within a housing.
Figure 3B:
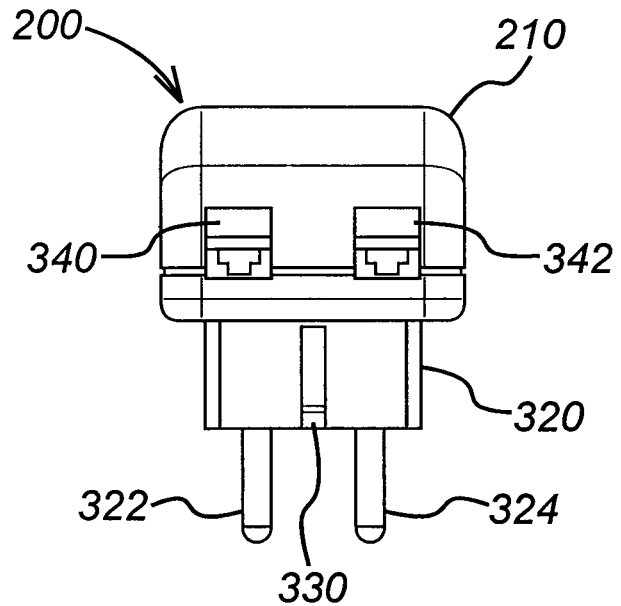
FIG. 3(B) is an end view of the power supply of FIG. 3(A).

With reference to FIGS. 3(A) and 3(B), there is illustrated a power supply (200) according to the present invention enclosed within a housing or case (210). As can be seen, the power supply (200) includes a plug (320) for releasable coupling to a corresponding socket (not shown), thereby enabling the power supply (200) to connect to the mains power. The live input (152) and the neutral input (154) of FIGS. 1 and 2 are shown in FIGS. 3(A) and 3(B) as male connectors (pins) (322, 324). Also, the ground terminal (110) is shown as a ground contact (330). Finally, telecommunication connectors (102, 104) are shown as telecommunication sockets (340, 342). Of course, this is only one suitable housing and connector arrangement. Other arrangements (such as the three pin arrangement common in the United Kingdom) known to the skilled person are equally applicable.

In use, a telecommunications signal (not shown) connects to the power supply (200) via the first telecommunications connector (102, 340). In normal operation, the telecommunication signal is below a threshold associated with the tripolar gasfuse (106) and is therefore routed to the second telecommunications connector (104, 342) via that gasfuse (106). The second telecommunications connector (104, 342), in turn, transmits the telecommunications signal to at least one telecommunications device (not shown).

When the incoming telecommunications signal carries any noise, high current surge, etc., that is when there is a power surge on the incoming telecommunications line, which can interfere/disrupt the normal operation of the telecommunications device, this may indicate that a threshold has been exceeded. In response to exceeding the threshold, the tripolar gasfuse (106) will shunt/divert (e.g. filter and redirect) the telecommunications signal to the ground terminal or contact (110, 320), thereby protecting any telecommunication devices being fed by the telecommunications signal from exposure to the noise, surge etc.

In addition to the shunting function of the tripolar gasfuse (106), the bipolar gasfuse (108) ensures that none of the noise, high current surge, etc. directed to ground, will be forwarded to the power supply electronic circuit (210), thereby preventing damage to the power supply electronic circuit (210). This is achieved by the bipolar gasfuse (108) providing a short circuit when a second threshold associated therewith is exceeded. The second threshold may be the same as or different to the first.

Moreover, the varistors (160, 170, 180, 190) protect the power supply (200) from power surges in the form of high current surges via the mains connection (152, 154, 322, 324) of the power supply (200). When a high current is experienced at the input of one or more of the varistors (160, 170, 180, 190), those varistors are triggered to shunt the high current away from the power supply electronic circuit (210) to the ground terminal/contact (110, 320).

In the present invention, optimum surge protection of the power supply was obtained by using at least three varistors; one across each of the three pairs of conductors (live-neutral, live-ground, neutral-ground).

Depending on the level of the applied voltage, the heat generated by a varistor may not be sufficient to cause failure, but may degrade the varistor device, thereby shortening its life. If an over-voltage is abruptly applied to the varistor, it may explode inside the case, resulting in the load remaining connected but now without any surge protection. Typically, the user has no indication when the surge protector has failed. Under the right conditions of over-voltage and line impedance, it may be possible to cause the varistor to burst into flames. In order to avoid the aforementioned problems, each varistor (160, 170, 180, 190) of the power supply (200) is protected by a corresponding thermal fuse (164, 172, 182, 194). As mentioned above, when a varistor is damaged, the load may still pass through the damaged varistor. The respective thermal fuse (164, 172, 182, 194) will receive this load. If the received load causes a specified threshold of the respective thermal fuse to be exceeded, the thermal fuse will short circuit, thereby preventing the respective varistor (160, 170, 180, 190) from catching fire due to continued exposure to the surge.

To ensure that the telecommunications device will receive a clear telecommunications signal, and to ensure that the power supply electronic circuit (210) does not cause any electromagnetic interference (EMI), etc., the protection circuitry (100, 150) is located a sufficient distance from the power supply electronic circuit (210).

It will of course be understood that this invention has been described above by way of example only, and that modifications of detail can be made within the scope of this invention.

The invention claimed is:

1. A power supply comprising:
   means for converting AC power received by a power input means to DC power outputted by a power output means;
   a ground terminal;
   means for receiving and transmitting a telecommunications signal from/to at least one telecommunications device; and
   means for protecting the telecommunications device and for protecting the power supply from a surge by shunting the surge to the ground terminal;
   wherein the means for protecting the telecommunications device comprises a first fuse connected in a receive/transmit path in the means for receiving and transmitting; and
   wherein the means for protecting the power supply comprises a second fuse coupled upstream of the first fuse and the ground terminal and coupled to the AC power to DC power converting means.

2. The power supply of claim 1, wherein the means for receiving and transmitting comprises a first telecommunications connector and a second telecommunications connector coupled communicatively to form a receive/transmit path.

3. The power supply of claim 2, wherein the first fuse is configured to route the telecommunications signal between the first telecommunications connector and the second telecommunications connector when a threshold has not been exceeded; and
   wherein the first fuse is configured to route the telecommunications signal to the ground terminal when a threshold has been exceeded.

4. The power supply of claim 1, wherein the second fuse is configured to prevent the surge from passing therethrough, and thus to ensure it routes to ground.

5. The power supply of claim 1, wherein the first fuse is a tripolar gasfuse.

6. The power supply of claim 5, wherein the second fuse is a tripolar gasfuse or a bipolar gasfuse.

7. The power supply of claim 6, wherein the first and second telecommunications connectors are physical sockets.

8. The power supply of claim 2, wherein the first and second telecommunications connectors each comprise an Asymmetric Digital Subscriber Line (ADSL) socket.

9. The power supply of claim 1, wherein the power supply further comprises a power input means and a power output means.

10. The power supply of claim 9, wherein the power supply further comprises at least three varistors coupled between the power input means and the ground terminal.

11. The power supply of claim 10, wherein the power input means comprises a live terminal and a neutral terminal, and a varistor is connected between each of the live and neutral terminals and a node, and between the node and the ground terminal.

12. The power supply of claim 10, wherein each varistor is coupled to a thermal fuse.

* * * * *

UNITED STATES PATENT AND TRADEMARK OFFICE
CERTIFICATE OF CORRECTION

PATENT NO. : 8,441,769 B2
APPLICATION NO. : 12/516090
DATED : May 14, 2013
INVENTOR(S) : Myran M. Ausch It is certified that error appears in the above-identified patent and that said Letters Patent is hereby corrected as shown below:

On the title page, item 73, under the Assignee Section delete the word "Limiteds" and replace with --Limited--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,441,769 B2 | Page 1 of 1 |
| APPLICATION NO. | : 12/516090 | |
| DATED | : May 14, 2013 | |
| INVENTOR(S) | : Myran M. Ausch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 178 days.

Signed and Sealed this
Ninth Day of December, 2014

Michelle K. Lee
*Deputy Director of the United States Patent and Trademark Office*